(12) United States Patent
Simonich et al.

(10) Patent No.: US 6,256,744 B1
(45) Date of Patent: Jul. 3, 2001

(54) PERSONAL COMPUTER COMPONENT SIGNAL LINE ISOLATION FOR AN AUXILIARY POWERED COMPONENT

(75) Inventors: Christopher E. Simonich, Hillsboro, OR (US); Robin T. Tran, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/158,962

(22) Filed: Sep. 21, 1998

(51) Int. Cl.[7] .................................................. G06F 1/26
(52) U.S. Cl. .............................. 713/340; 713/300
(58) Field of Search .............................. 710/100–103, 710/126–130; 713/300, 340

(56) References Cited

U.S. PATENT DOCUMENTS

| | | | | |
|---|---|---|---|---|
| 4,435,764 | * | 3/1984 | El-Gohary | 709/253 |
| 4,754,160 | * | 6/1988 | Ely | 307/64 |
| 4,763,013 | * | 8/1988 | Gvoth, Jr. et al. | 307/66 |
| 4,908,790 | * | 3/1990 | Little et al. | 714/14 |
| 4,964,011 | * | 10/1990 | Sternglass | 361/88 |
| 5,391,940 | * | 2/1995 | Linn | 326/21 |
| 5,534,791 | * | 7/1996 | Mattos et al. | 326/27 |
| 5,644,251 | | 7/1997 | Colwell et al. | 326/16 |
| 5,670,890 | | 9/1997 | Colwell et al. | 324/765 |
| 5,701,072 | * | 12/1997 | Jeon et al. | 323/312 |
| 5,793,226 | * | 8/1998 | Park et al. | 326/86 |
| 5,917,250 | * | 6/1999 | Kakalec et al. | 307/18 |
| 5,977,656 | * | 11/1999 | John | 307/43 |

* cited by examiner

Primary Examiner—Sumati Lefkowitz
(74) Attorney, Agent, or Firm—Akin, Gump, Strauss, Hauer & Feld, LLP

(57) ABSTRACT

In a personal computer system utilizing both a main power supply and an auxiliary power supply, the input and output signal lines of auxiliary powered components are selectively isolated from components powered solely by the main power supply. Gating circuitry and buffer circuitry, controlled by various enable signals, are used to isolate the signal lines. External pull-down or pull-up resistors are no longer required, which frees up printed circuit board area for other components and conserves board space in the computer system.

25 Claims, 3 Drawing Sheets

PERSONAL COMPUTER COMPONENT SIGNAL LINE ISOLATION FOR AN AUXILIARY POWERED COMPONENT

BACKGROUND OF THE INVENTION

1. Field of the Invention

The present invention relates to personal computers, and more particularly to an apparatus and method of internally isolating personal computer components powered by an auxiliary power supply from components powered only by a main power supply.

2. Description of the Related Art

Recently, in certain personal computers an auxiliary power supply has been used to keep part of the system functional when a main computer power supply is down. The components in such a part of the system receiving power from the auxiliary power supply are used to "wake up" the machine at the appropriate time.

When the main power turns off, an auxiliary powered component with an output connected to an input of a component powered only by the main power supply should be prevented from driving a signal on that signal line to the "high" state. The auxiliary powered component must be prevented from driving a signal to the high state, because applying a voltage to the input of the component without power may supply enough voltage/current to cause the component to start operating randomly. Random operation is not desirable as randomly active signals can potentially disturb internal circuitry of the auxiliary powered components.

Further, inputs to auxiliary powered components connected to a component powered by the main power supply would float in voltage level in certain cases. This would occur, for example when the main power turns off if the inputs to the auxiliary powered components were not properly terminated. Many personal computer components are complementary metal oxide semiconductor (CMOS) integrated circuits. Leaving unused inputs of a CMOS component floating causes problems. A CMOS component with an input left floating may enter the active mode of operation with only minimal leakage current, due to the component's high input impedance. Normally, leakage currents are such that a CMOS component with an input floating will enter the active mode. Also, the unpowered input signal line can act like an antenna and begin to absorb signal energy present in the machine. After doing so, it can supply a valid logic voltage to the auxiliary powered component. This can disturb circuits not expecting such levels on that signal line. In addition, switching of the internal CMOS circuitry is inefficient as it needlessly consumes power.

One solution to this problem has been to couple an external pull-down resistor between ground and the signal line being isolated, or an external pull-up resistor between a positive rail of an active power supply and the signal line being isolated.

However, this approach had several undesirable features. The pull-up or pull-down resistors were separate or discrete circuit elements. If a large number of signal lines needed isolation, large amounts of board space could be consumed by the added resistor elements. Further, the additional resistors increased the computer system cost in terms of both the cost of the added resistors and the burden to the system of extra components.

SUMMARY OF THE PRESENT INVENTION

The present invention provides a technique for selectively isolating a signal line in a computer system using multiple power supplies. When a main power supply is inactive, an auxiliary power supply provides power to a component powered by the auxiliary power supply. Isolation circuitry according to the present invention implements gating circuitry and buffer circuitry, that is controlled by various enable signals, to isolate the signal line. The signal line is isolated by coupling the signal line to an appropriate power rail through a resistance provided by the buffer circuitry. In an embodiment of the present invention, the isolation circuitry is implemented on a monolithic integrated circuit with the component powered by the auxiliary power supply.

In one embodiment, the isolation circuitry selectively isolates an input signal line of the component powered by the auxiliary power supply from an output signal line of a component powered by the main power supply. In another embodiment, the isolation circuitry selectively isolates an output signal line of the component powered by the auxiliary power supply from an input signal line of the component powered by the main power supply. In either of the previous embodiments, the isolation circuitry is electrically coupled between the signal line and internal logic of the component powered by the auxiliary power supply. Alternatively, when the isolation circuitry is integrated within the component powered by the auxiliary power supply, the isolation circuitry is electrically coupled between a bonding pad and the internal logic of the component.

A technique of isolation that does not require external resistors is highly desirable, since added external resistors result in additional cost and can potentially deplete considerable amounts of printed circuit board space that could be used for other circuitry. When there are multiple components that require isolation, the reduction in the number of external isolation resistors and the availability of the printed circuit board area previously used by the external isolation resistors can result in significant benefits.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Computer System Overview

Figure 1:
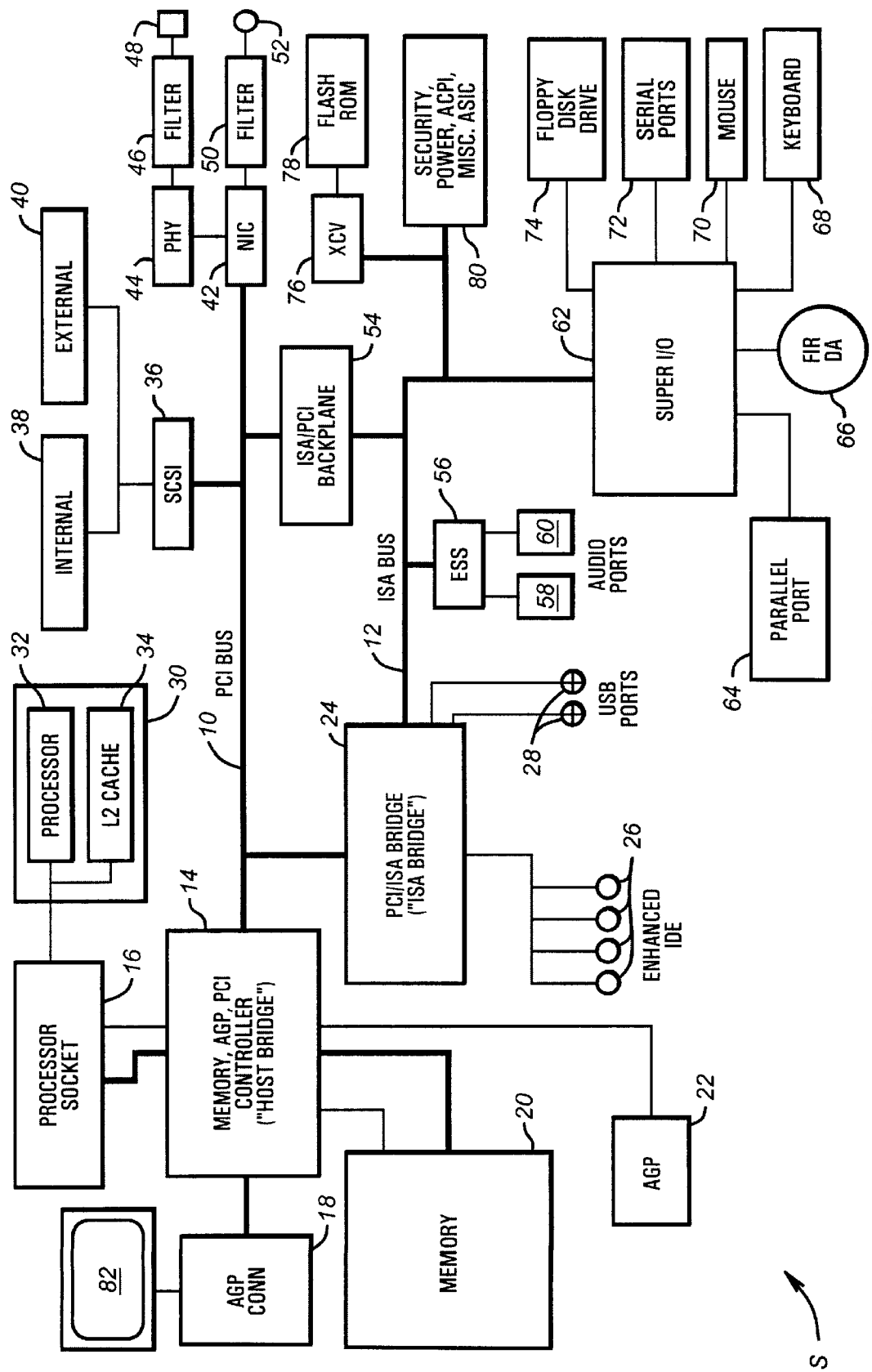
FIG. 1 is a block diagram of the computer system S implemented according to the present invention.

Turning to FIG. 1, illustrated is a typical personal computer system S implemented according to the invention. In the embodiment of FIG. 1, the computer system S is a microprocessor-based system. While this system is illustrative of one embodiment, the present invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, and a memory subsystem 20. A second bridge circuit, a PCI/ISA bridge 24 (the "ISA bridge") bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX North Bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decoding. The standard personal computer input/output (I/O) functions are supported, including a direct memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), RTC, keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit (I$^2$C) protocol.

The PCI bus 10 couples a variety of devices that generally take advantage of a high speed data path. This includes a small computer system interface (SCSI) controller 36, with both an internal port 38 and an external port 40. In the disclosed embodiment, the SCSI controller 36 is a AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to an RJ-45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse port 70, additional series ports 72, and a floppy disk drive controller for a floppy disk drive 74. These devices are coupled through connectors to the Super I/O 62.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic.

Finally, a video display 82 can be coupled to the AGP connector 18 for display of data by the computer system S. Again, a wide variety of systems could be used instead of the disclosed system S without detracting from the spirit of the invention.

Prior Technique Of Signal Line Isolation

Figure 2:
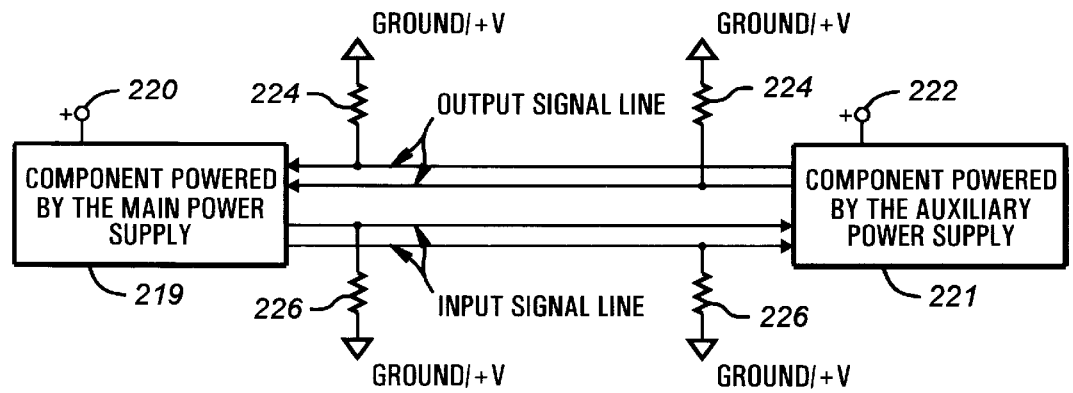
FIG. 2 is a schematic electrical circuit diagram illustrating a prior art technique of signal line isolation.

FIG. 2 illustrates a prior art technique for isolating a signal line between components within the computer system S. In FIG. 2, a component 219 powered by a main power supply 220 is indicated. Signal lines from component 219 are isolated from signal lines of component 221 using external isolation resistors 224 and 226. Component 221 is powered by an auxiliary power supply 222. The isolation resistors 224 and 226 are shown coupled between the signal lines and a voltage reference level, either an electrical ground or a positive power supply rail. If pull-down resistors are needed the resistors are coupled between the signal lines and ground. If pull-up resistors are desired, the resistors would be coupled between the signal lines and the positive power supply rail.

As stated previously, this prior art approach had several undesirable features. The pull-up or pull-down resistors were separate or discrete circuit elements. If a large number of signal lines needed isolation, large amounts of board space could be consumed by the added resistor elements. Further, the additional resistors increased the computer system cost in terms of both the cost of the added resistors and the burden to the system of extra components.

Signal Line Isolation According To The Present Invention

Figure 3:
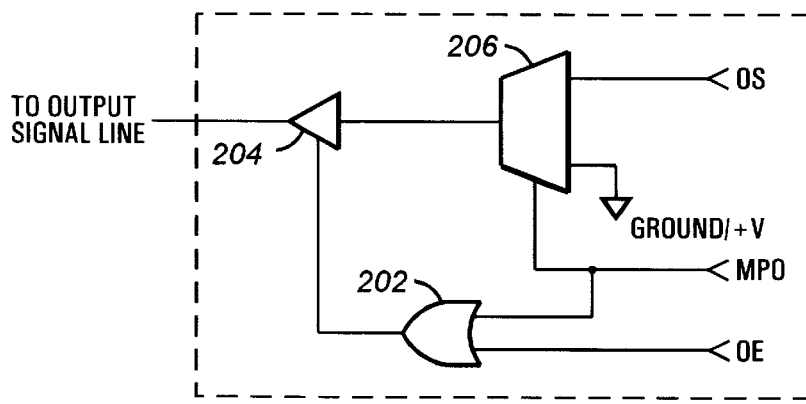
FIG. 3 is a schematic diagram illustrating the circuitry added to an output according to an embodiment of the present invention.
Figure 4:
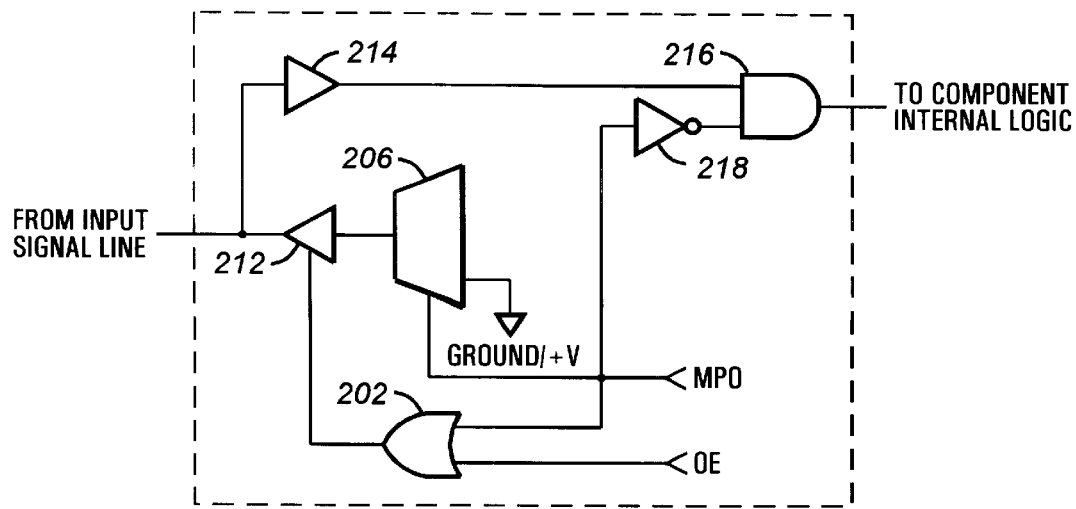
FIG. 4 is a schematic diagram illustrating the circuitry added to an input according to an embodiment of the present invention.

Moving to FIGS. 3 and 4 shown are embodiments according to the present invention for isolating a signal line. FIG.

3 illustrates circuitry added to an output of an auxiliary powered component according to one embodiment of the present invention. FIG. 4 shows circuitry added to an input of the auxiliary powered component according to another embodiment of the present invention. Both FIGS. 3 and 4 detail how an external resistor is replaced with isolation circuitry which is preferably internal to the component powered by an auxiliary power supply. If a pull-down resistor is needed, a first input of multiplexer 206 is coupled to ground. If a pull-up resistor is needed, the first input of multiplexer 206 is coupled to a positive rail of the auxiliary power supply.

In FIG. 4, if multiplexer 206 is not utilized then buffer 212's input is directly coupled to ground or the positive power supply rail (as appropriate). If the additional circuitry is implemented on a monolithic integrated circuit with the auxiliary powered component, the additional circuitry is electrically coupled between a bonding pad (not shown) and internal logic of the component.

The following discussion uses positive logic in the description of the various enable signals. In this discussion, a low state is in effect a false logic state and a high state is in effect a true logic state. It should be apparent that the circuitry could be implemented using negative logic. If negative logic is used, the high state serves as the false logic state and the low state serves as the true logic state. The enable signals may be supplied by ASIC 80 or by another source. The isolation circuitry may be implemented within ASIC 80 or any other auxiliary powered component. Auxiliary powered components include, for example, the ISA bridge 24, the NIC 42, the physical layer 44, and the Super I/O chip 62.

Turning back to FIG. 3, shown is an embodiment of the isolation circuitry for an output signal line of the auxiliary powered component within the computer system S. The isolation circuitry includes a tri-state output buffer 204, a two-input OR gate 202, and a two-input multiplexer 206. A main power off MPO signal is coupled to a control line of the two-input multiplexer 206 and a first input of the two-input OR gate 202. Gating circuitry is comprised of the two-input multiplexer 206 and the two-input OR gate 202. Buffer circuitry includes the output buffer 204. The main power off MPO signal provides a first enable signal that senses the state of the main power supply. The main power off MPO signal of the disclosed embodiment is high when the main power is off.

An output of the output buffer 204 is coupled to the output signal line. An input of the output buffer 204 is coupled to an output of the two-input multiplexer 206. A first input of the two-input multiplexer 206 is coupled to an auxiliary power supply rail. If a pull-down resistor is required the input of multiplexer 206 is coupled to ground. If a pull-up resistor is required the input of multiplexer is coupled to the positive power supply rail.

A second input of multiplexer 206 is coupled to an output OS signal which originates from the internal logic of the auxiliary powered component. A control line of the output buffer 204 is coupled to an output of the two-input OR gate 202. The output of the two-input OR gate 202 provides a third enable signal which acts as a control signal. Coupled to a first input of the OR gate 202 is the main power off MPO signal. Coupled to a second input of the OR gate 202 is an output enable OE signal. The output enable OE signal provides a second enable signal which acts as a buffer enable signal.

Again, when main power is off, the main power off MPO signal is high. When the main power off MPO signal is high the grounded input (or the input connected to the positive auxiliary power supply rail) of the two-input multiplexer 206 is selected to drive the output buffer 204. Thus, the output buffer 204 is enabled whether the output enable OE signal is high or low when the main power off MPO signal is high. If both the output enable OE signal and the main power off MPO signal are low, then the output buffer 204 is in the tri-state condition (high impedance state).

When the main power off MPO signal is high (main power is off) the output buffer 204 couples the output signal line to ground (or to the positive power supply rail). When the main power off MPO signal is low (main power is on) an output OS signal from the internal logic of the component is selected and is passed to the input of the device that is coupled to the auxiliary powered component, if the output enable OE signal is high.

Moving to FIG. 4, an embodiment of the isolation circuitry associated with one of the input signal lines within the computer system S is shown. The isolation circuitry includes an output buffer 212 and a two-input OR gate 202. As in the case of an output signal, the main power off MPO signal is coupled to the first input of the two-input OR gate 202. Again, the main power off MPO signal senses the state of the main power supply and is high when the main power is off. An output of the output buffer 212 is coupled to the input signal line.

In one embodiment, an input of the output buffer 212 is coupled to the output of the multiplexer 206. One input of the multiplexer 206 is coupled to one of the auxiliary power supply rails. If a pull-down resistor is required, the input of multiplexer 206 is coupled to ground. If a pull-up resistor is required, the input of multiplexer 206 is coupled to the positive auxiliary power supply rail. In another embodiment, the multiplexer 206 is not utilized and the input of the output buffer 212 is directly coupled to the ground rail or the positive power supply rail. A control line of the output buffer 212 is coupled to the output of the two-input OR gate 202. As above, the output of the two-input OR gate 202 provides the control signal.

As previously related, coupled to the second input of the OR gate 202 is the output enable OE signal which acts as the buffer enable signal. When main power is off, the main power off MPO signal is high. When the main power off MPO signal is high, the output buffer 212 is enabled whether the output enable OE signal is high or low. If both the output enable OE signal and the main power off MPO signal are low, then the output buffer 212 is disabled. When the main power off MPO signal is high (main power is off) the output buffer 212 is enabled and the input signal line is coupled to the ground rail or the positive power supply rail.

In the case of the input signal line, the output buffer in FIG. 4 is a bi-directional buffer. The input circuitry consists additionally of an input buffer 214, an inverter 218, and a two-input AND gate 216. Buffer circuitry for the input signal line includes the input buffer 214 and the output buffer 212. Gating circuitry for the input signal line comprises the inverter 218, the OR gate 202, the AND gate 216, and the multiplexer 206 (if present).

When the isolation circuitry is integrated with the component powered by the auxiliary power supply, an input of the input buffer 214 is coupled to an input bonding pad (not shown) of the auxiliary powered component. An output of the input buffer 214 is also coupled to a first input of the two-input AND gate 216. The main power off MPO signal is coupled to an input of the inverter 218. An output of the inverter 218 is coupled to a second input of the two-input AND gate 216. The output of the inverter 218 provides a fourth enable signal which is used to block a signal on the input signal line. The output stage 212 of the bi-directional output buffer is turned on when the main power off MPO signal is high (main power is inactive or off) which results in the input signal line being coupled to the ground rail (or to the positive power supply rail).

Also, when the main power off MPO signal is high (main power is off) the output of the inverter 218 is low. A low to one input of the two-input AND gate 216 causes an output of the gate to go low; thereby blocking a signal from the output of an external device powered by the main power supply from toggling the internal logic of the auxiliary powered component. When the main power off MPO signal is low (main power is on) one input to the two-input AND gate 216 is high and the input signal is passed to the internal logic of the auxiliary powered component, if the output buffer 212 is disabled.

Figure 5:
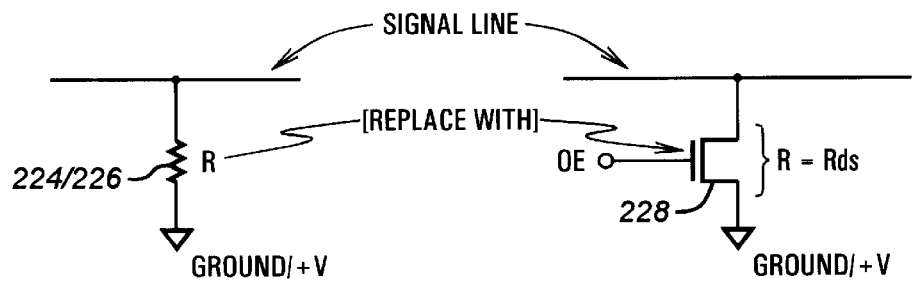
FIG. 5 is a simplified schematic electrical circuit diagram of a new technique of isolation according to the present invention.

Moving to FIG. 5, a simplified embodiment for isolating a signal line within the computer system S according to the present invention is illustrated. The drawing depicts external resistors 224 or 226 being replaced with a FET 228. When the FET 228 is turned on the channel resistance of the device serves as the resistor 224 or 226 between the signal line and the ground rail or the positive auxiliary power supply rail. As discussed previously, if a pull-up resistor is required one end of the FET 224 or 226 is connected to the positive auxiliary power supply rail. In the disclosed embodiment according to the present invention an internal channel resistance of buffer 204 (FIG. 3) or buffer 212 (FIG. 4) provides an isolation resistance between the signal line and the ground rail or the positive power supply rail.

Figure 6:
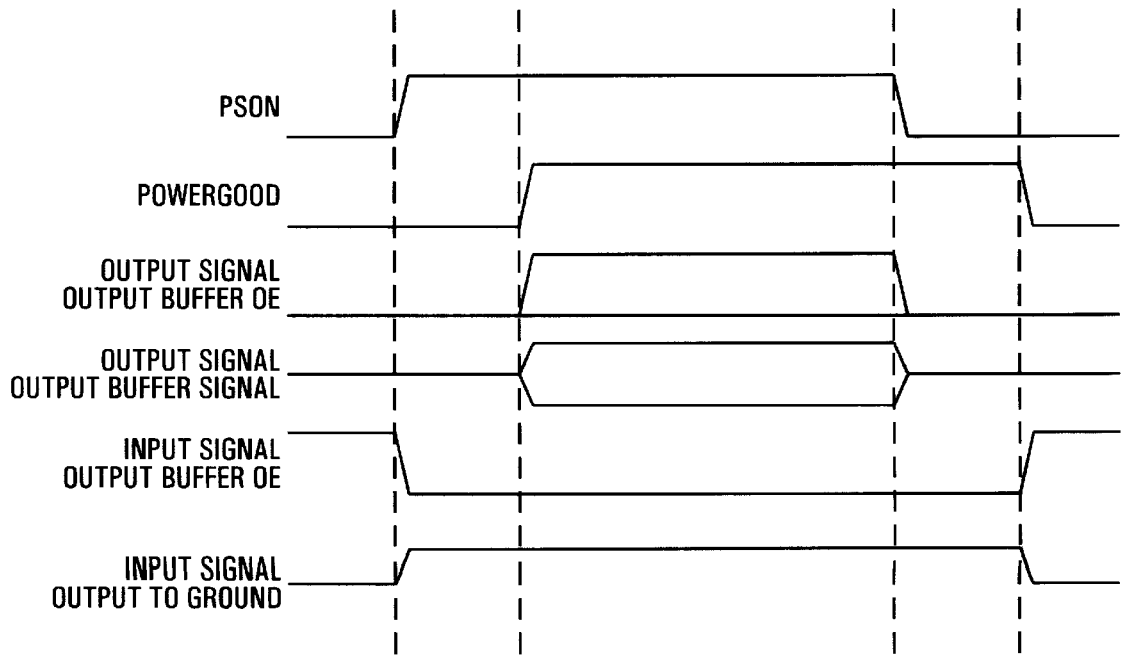
FIG. 6 is a timing diagram of an embodiment according to the present invention.

Turning to FIG. 6, a timing diagram of one aspect of the present invention is illustrated. The following discussion assumes that the inputs of buffers 204 (see FIG. 3) and 212 (see FIG. 4) are coupled to ground. FIG. 6 is provided to aid one skilled in the art to more readily visualize when power related activity occurs. PSON is a control signal supplied by the ASIC 80. The ASIC 80 turns the main power supply on or off. When the PSON signal is high, the main power supply for the computer system S turns on. When the PSON signal is low, the main power supply for the computer system S turns off. POWERGOOD is a signal supplied from the main power supply or supplied by components on the system board indicating that a valid voltage level exists on the main power supply rail. The main power off MPO signal is high when both PSON and POWERGOOD are low. The POWERGOOD signal is used by the computer system S to determine when the reset process can begin. The ASIC 80 uses this signal in determining when to activate or deactivate the isolation buffers 204 and 212.

When the main power is off, with both PSON low and POWERGOOD low, the output buffer 212 on the input signal line turns on and drives the signal trace to ground (when the input of the buffer 212 is coupled to the ground rail). When PSON is driven high, the output buffer 212 turns off. The buffer 212 turns off at this point because while the POWERGOOD signal may not be active, indicating a valid voltage level, there can be voltage applied to a component within the computer system S. Therefore, it is possible that some components might begin to drive an input signal line of the auxiliary powered component to the high state. If this happens, there would be a contention with the output buffer 212 which is driving a low. Turning off the output buffer 212 for the input signal line when PSON is driven high prevents this from occurring. The output buffer 212, for the input signal line, turns on after both the PSON signal and the POWERGOOD signal have returned to a low state.

The output signals of the auxiliary powered components are held in the high impedance state unless both the PSON signal and the POWERGOOD signal are high. The reason is that the main system operations is only valid at that time. If the output signals were to drive an input of a part powered by the main power supply to the high state while main power is off they might damage that part.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system capable of selectively isolating a signal line comprising:

a processor coupled to the signal line;

a main power supply furnishing power to the computer system;

an auxiliary power supply furnishing power to the computer system on auxiliary power supply rails when the main power supply is inactive;

a component coupled to the signal line and powered only by the main power supply; and an auxiliary powered component powered by the auxiliary power supply and having isolation circuitry connecting internal logic of the auxiliary powered component to the signal line at an opposite end of the signal line from the component powered only by the main power supply, the isolation circuitry comprising:

gating circuitry responding to the state of the main power supply and a buffer enable signal, the gating circuitry forming a control signal in response to the state of the main power supply and the buffer enable signal; and buffer circuitry responding to the control signal, the buffer circuitry coupling the signal line to one of the auxiliary power supply rails when the main power supply is inactive.

2. The computer system of claim 1, wherein the isolation circuitry is internal to the auxiliary powered component.

3. The computer system of claim 1, wherein the signal line is an input signal line.

4. The isolation circuitry of claim 3, the gating circuitry further blocking a signal on the input signal line from the internal logic of the auxiliary powered component when the main power supply is inactive.

5. The isolation circuitry of claim 3, further including an isolation resistance in the buffer circuitry coupling the input signal line to one of the auxiliary power supply rails in response to the gating circuitry control signal when the main supply is inactive.

6. The isolation circuitry of claim 3, the buffer circuitry and the gating circuitry further coupling the input signal line to the internal logic of the auxiliary powered component responsive to the buffer enable signal when the main power supply is active.

7. The computer system of claim 1, wherein the signal line is an output signal line.

8. The isolation circuitry of claim 7, the gating circuitry further coupling the output signal line to the internal logic of the auxiliary powered component responsive to the buffer enable signal when the main power supply is active.

9. The isolation circuitry of claim 7, the gating circuitry further coupling the output signal line to one of the auxiliary power supply rails through an isolation resistance in the buffer circuitry when the main power supply is inactive.

10. A method for selectively isolating internal logic of a computer system auxiliary powered component powered by an auxiliary power supply from a signal line in the computer system when a main power supply is inactive, the signal line coupled to a component powered only by a main power supply, the method comprising the steps of:

coupling the auxiliary powered component to the signal line at an opposite end of the signal line from the component powered only by the main power supply;

sensing whether the main power supply is inactive; and coupling the signal line to an auxiliary power supply rail when the main power supply is inactive.

11. The method of claim 10, wherein the signal line is an input signal line.

12. The method of claim 11, further comprising the step of: blocking a signal on the input signal line when the main power supply is inactive.

13. The method of claim 11, further comprising the step of:

coupling the internal logic of the auxiliary powered component to the input signal line when the main power supply is active.

14. The method of claim 10, wherein the signal line is an output signal line.

15. The method of claim 14, further comprising the step of:

coupling the internal logic of the auxiliary powered component to the output signal line responsive to a buffer enable signal when the main power supply is active.

16. The method of claim 14, further comprising the step of:

tri-stating the output signal line responsive to a buffer enable signal when the main power supply is active.

17. Isolation circuitry capable of selectively isolating a signal line of an auxiliary powered component powered by an auxiliary power supply from a component coupled to the signal line and powered only by a main power supply, the auxiliary power supply furnishing power on auxiliary power supply rails, the isolation circuitry comprising:

gating circuitry responding to the state of the main power supply and a buffer enable signal, the gating circuitry forming a control signal in response to the state of the main power supply and the buffer enable signal;

buffer circuitry responding to the control signal, the buffer circuitry coupling the signal line to one of the auxiliary power supply rails when the main power supply is inactive; and the gating and buffer circuitry disposed at an opposite end of the signal line from the component powered only by the main power supply.

18. The isolation circuitry of claim 17, wherein the isolation circuitry is internal to the auxiliary powered component.

19. The isolation circuitry of claim 17, wherein the signal line is an input signal line.

20. The isolation circuitry of claim 19, the gating circuitry further blocking a signal on the input signal line from the internal logic of the auxiliary powered component when the main power supply is inactive.

21. The isolation circuitry of claim 19, further including an isolation resistance in the buffer circuitry coupling the input signal line to one of the power supply rails in response to the gating circuitry control signal when the main power supply is inactive.

22. The isolation circuitry of claim 19, the buffer circuitry and the gating circuitry further coupling the input signal line to the internal logic of the auxiliary powered component when the main power supply is active.

23. The isolation circuitry of claim 22, wherein the signal line is an output signal line.

24. The isolation circuitry of claim 23, the gating circuitry further coupling the output signal line to the internal logic of the auxiliary powered component responsive to the buffer enable signal when the main power supply is active.

25. The isolation circuitry of claim 23, the gating circuitry further coupling the output signal line to one of the power supply rails through an isolation resistance in the buffer circuitry when the main power supply is inactive.

* * * * *